Dec. 17, 1968     N. W. KALENDA     3,416,927
SILVER HALIDE EMULSIONS CONTAINING SUPERSENSITIZING
COMBINATIONS OF MEROCYANINE DYES
Filed Oct. 20, 1966

FIG. 1

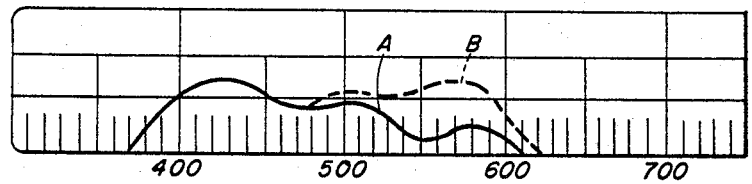

A = DYE I = 3-(2-DIETHYLAMINOETHYL-5-[(3-ETHYL-2-BENZOTHIAZOLINYLIDENE ETHYLIDENE]-2-THIO-2,4-OXAZOLIDINEDIONE

B = DYE I WITH LEUCOPHOR B (a BIS (s-TRIAZIN-2-YLAMINO)STILBENE-2-2'-DISULFONIC ACID, SODIUM SALT)

FIG. 2

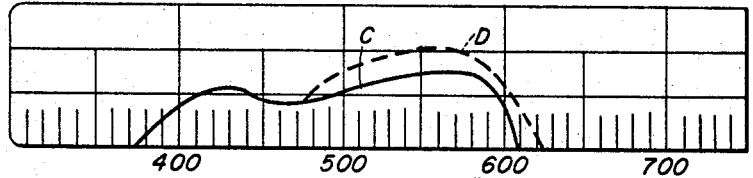

C = DYE VIII = 3-(3-DIMETHYLAMINOPROPYL)-5-[(3-ETHYL-2-BENZOTHIAZOLINY-LIDENE) ISOPROPYLIDENE]-2-THIO-2,4-OXAZOLIDINEDIONE

D = DYE VIII WITH LEUCOPHOR B (a BIS (s TRIAZIN-2-YLAMINO)STILBENE-2-2'DISULFONIC ACID, SODIUM SALT

FIG. 3

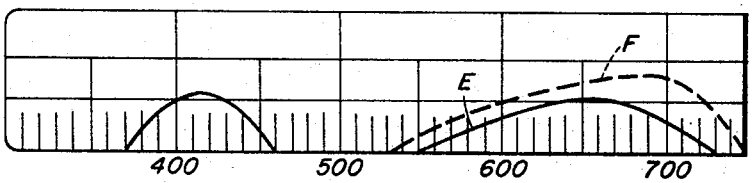

E = DYE XXXI = 5-[4-(3-ETHYL-2(3)-α-NAPHTHOTHIAZOLINYLIDENE)-2-BUTENY-LIDENE]-3-n-HEPTYL-1-PHENYL-2-THIOHYDANTOIN

F = DYE XXXI WITH CALCOFLUOR WHITE-MR (a BIS (s TRIAZIN-2-YLAMINO) STILBENE-2,2'-DISULFONIC ACID, SODIUM SALT)

NORMAN W. KALENDA
INVENTOR.

BY *R. Frank Smith*

*Ray Carter Livermore*

ATTORNEY & AGENT 3,416,927
SILVER HALIDE EMULSIONS CONTAINING SUPERSENSITIZING COMBINATIONS OF MEROCYANINE DYES
Norman W. Kalenda, Rochester, N.Y., assignor to Eastman Kodak Company, Rochester, N.Y., a corporation of New Jersey
Filed Oct. 20, 1966, Ser. No. 598,570
16 Claims. (Cl. 96—100)

ABSTRACT OF THE DISCLOSURE

Photographic silver halide emulsions sensitized by simple merocyanines, merocarbocyanines or merodicarbocyanine dyes are advantageously supersensitized by adding at least one sulfonic acid derivative of a bis(triazinylamino)stilbene, a dibenzothiophene dioxide, a biphenyl, a terphenyl, a quaterphenyl, a phenanthrene, a pyrene, or a chrysene.

---

This application is a continuation-in-part application of Kalenda U.S. Ser. No. 416,714, filed Dec. 8, 1964, now abandoned.

This invention relates to photographic silver halide emulsions containing simple merocyanine, merocarbocyanine or merodicarbocyanine dyes, and in supersensitizing combination therewith, certain sulfonated compounds.

It is known in the art of making photographic emulsions that certain dyes of the cyanine class alter the sensitivity of gelatino-silver-halide photographic emulsions when the dyes are incorporated in the emulsions. It is also known that the sensitization produced by a given dye varies somewhat with the type of emulsion in which the dye is incorporated. Furthermore, the sensitization of a given emulsion by a given dye may be altered by varying the conditions in the emulsion. For example, the sensitization may be increased by increasing the silver ion concentration or decreasing the hydrogen ion concentration (i.e., increasing the alkalinity), or both. Thus, sensitization can be increased by bathing plates, coated with a spectrally sensitized emulsion, in water or in aqueous solutions of ammonia. Such a process of altering the sensitivity of a sensitized emulsion by increasing the silver ion concentration and/or by decreasing the hydrogen ion concentration is commonly called "hypersensitization." Hypersensitized emulsions have generally poor keeping qualities. Various combinations of two or more sensitizing dyes have also been proposed to alter the sensitivity of such emulsions.

I have now found that photographic emulsions containing simple merocyanine, or merocarbocyanine or merodicarbocyanine dyes are markedly increased in sensitivity by incorporating therewith certain sulfonated compounds. This method is designated herein as supersensitization and the combinations of dyes as supersensitizing combinations.

It is, therefore, an object of my invention to provide photographic emulsions containing simple merocyanine, merocarbocyanine, or merodicarbocyanine dyes and, in supersensitizing combination therewith, certain sulfonated compounds. Another object is to provide methods for making these emulsions. Other objects will become apparent from a consideration of the following description and examples.

The simple merocyanine, merocarbocyanine and merodicarbocyanine dyes useful in practicing my invention comprise those dyes represented by the following general formulas:

I. 

II. 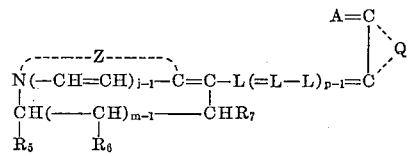

and

III. 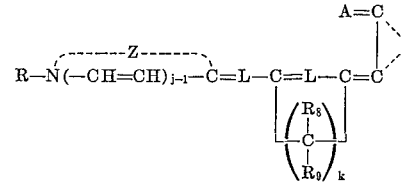

wherein each A represents an oxygen or sulfur atom, each R represents an alkyl group having from 1 to 8 carbon atoms, e.g., methyl, sulfoethyl, carboxyethyl, hydroxypropyl, sulfobutyl, carboxybutyl, hexyl, octyl, etc., or an aryl group, e.g., phenyl, sulfophenyl, carboxyphenyl, tolyl etc.; Z represents the non-metallic atoms required to complete a 5- to 6-membered heterocyclic nucleus such as those selected from the class consisting of a thiazole nucleus (e.g., thiazole, 4-methylthiazole, 4-phenylthiazole 5-methylthiazole, 5-phenylthiazole, 4,5-dimethylthiazole 4,5-diphenylthiazole, 4-(2-thienyl)thiazole, etc.), a benzothiazole nucleus (e.g., benzothiazole, 4-chlorobenzothiazole, 5-chlorobenzothiazole, 6-chlorobenzothiazole 7-chlorobenzothiazole, 4-methylbenzothiazole, 5-methyl benzothiazole, 6-methylbenzothiazole, 5-bromobenzothiazole, 6-bromobenzothiazole, 4-phenylbenzothiazole 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole 5-ethoxybenzothiazole, tetrahydrobenzothiazole, 5,6-dimethoxybenzothiazole, 5,6-dioxymethylenebenzothiazole 5-hydroxybenzothiazole, 6-hydroxybenzothiazole, etc.) a napthothiazole nucleus, (e.g., α-naphthothiazole, β naphthothiazole, 5-methoxy-β, β-naphthothiazole, 5 ethoxy-β-naphthothiazole, 8-methoxy-α-naphthothiazole 7-methoxy-α-naphthothiazole, etc.), a thionaphtheno-7' 6',4,5,-thiazole nucleus (e.g., 4'-methoxythianaphtheno 7',6',4,5-thiazole, etc.), an oxazole nucleous (e.g., 4 methyloxazole, 5-methyloxazole, 4-phenyloxazole, 4,5 diphenyloxazole, 4-ethyloxazole, 4,5-dimethyloxazole, 5 phenyloxazole, etc.), a benzoxazole nucleus (e.g., benzoxazole, 5-chlorobenzoxazole, 5-methyl-benzoxazole, 5 phenylbenzoxazole, 6-methylbenzoxazole, 5,6-dimethyl benzoxazole, 4,6-dimethylbenzoxazole, 5-methoxybenzoxazole, 5-ethoxybenzoxazole, 5-chlorobenzoxazole, 6-methoxybenzoxazole, 5 - hydroxybenzoxazole, 6 - hydroxy benzoxazole, etc.), a naphthoxazole nucleus (e.g., α naphthoxazole, β-naphthoxazole, etc.), a selenazole nucleus (e.g., 4-methylselenazole, 4-phenylselenazole, etc.), a benzoselenazole nucleus (e.g., benzoselenazole, 5-chlorobenzoselenazole, 5-methoxybenzoselenazole, 5-hydroxybenzoselenazole, tetrahydrobenzoselenazole, etc.), a naphthoselenazole nucleus (e.g., α-naphthoselenazole, β-naphthoselenazole, etc.), a thiazoline nucleus (e.g., thiazoline, 4-methylthiazoline, etc.), a 2-pyridine nucleus (e.g., 2-pyridine, 5-methyl-2-pyridine, etc.), a 2-quinoline nucleus (e.g., 2-quinoline, 3-methyl-2-quinoline, 5-ethyl-2-quinoline, 6-chloro-2-quinoline, 8-chloro-2-quinoline, 6-methoxy-2-quinoline, 8-ethoxy-2-quinoline, 8-hydroxy-2-quinoline, etc.), a 4-quinoline nucleus (e.g., 4-quinoline, 6-methoxy-4-quinoline, 7-methyl-4-quinoline, 8-chloro-4-quinoline, etc.), a 1-isoquinoline nucleus (e.g., 1-isoquinoline, 3,4-dihydro-1-isoquinoline, etc.), a 3-isoquinoline nucleus (e.g., 3-isoquinoline, etc.), a 3,3-dialkylindolenine nucleus (e.g., 3,3-dimethylindolenine, 3,3,5-trimethylindolenine, 3,3,7-trimethylindolenine, etc.), an imidazole nucleus (e.g., imidazole, 1-alkylimidazole, 1-alkyl-4-phenylimidazole, 1-alkyl-4,5-dimethylimidazole, etc.), a benzimidazole nucleus (e.g., benzimidazole, 1-alkylbenzimidazole, 1-aryl - 5,6 - dichlorobenzimidazole, etc.), a naphthimidazole nucleus (e.g., 1-alkyl-α-naphthimidazole, 1-aryl-β-naphthimidazole, 1-alkyl-5-methoxy-α-naphthimidazole, etc.), etc.; L represents a methine groups (e.g., —CD= where D represents hydrogen, a lower alkyl group, such as, methyl, ethyl, butyl, etc., and an aryl group, such as phenyl, tolyl, naphthyl, etc.) such that not more than one L group contains a D group that is other than the hydrogen atom; $j$, $m$, and $p$ each represent an integer of from 1 to 2; $k$ represents an integer from 2–3; $n$ represents an integer of from 1 to 3; Q represents a group, such as, $$-\underset{\underset{R_1}{|}}{C}=N-N-,\ -S-\underset{\underset{Y}{|}}{C}-N-,\ -O-\underset{\underset{Y}{\|}}{C}-N-,\ -N-\underset{\underset{Y}{\|}}{C}-N-$$

$$-\underset{\underset{O}{\|}}{C}-\underset{\underset{Y_1}{|}}{N}-\underset{\underset{O}{\|}}{C}-N-,\ -\underset{\underset{O}{\|}}{C}-N-\underset{\underset{S}{\|}}{C}-N-,\ -N-CH=N-\underset{R}{\underset{|}{\phantom{X}}}\overset{}{\underset{X}{\searrow}}$$

etc., in which R is as described previously; $R_1$ represents any of the groups used on the 3-position of 2-pyrazolin-5-ones, e.g., hydrogen, alkyl (e.g., methyl, isopropyl, tertiary butyl, hexyl, etc.), aryl (e.g., phenyl, tolyl, halophenyl, etc.), amino (e.g., methylamino, diethylamino, phenylamino, etc.), acylamino (e.g., acetylamino, propionylamino, butyrylamino, benzoylamino, etc.), substituted sulfonamido (e.g., butylsulfonamido, phenylsulfonamido, etc.) substituted sulfamyl (e.g., propylsulfamyl, phenylsulfamyl, etc.), substituted carbamyl (e.g., ethylcarbamyl, phenylcarbamyl, etc.); W represents the sulfur, selenium or the oxygen atom; Y and $Y_1$ each represent a group selected from the class consisting of the hydrogen atom, an alkyl group (e.g., methyl, ethyl, butyl, etc.), an aryl group (e.g., phenyl, tolyl, etc.),

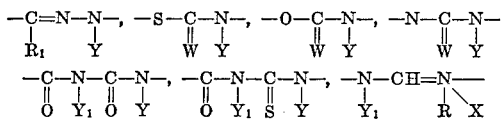

$q$ represents an integer of from 1 to 6, $R_2$, $R_3$, and $R_4$ each represents an alkyl group (e.g., methyl, propyl, butyl, carboxyethyl, hydroxypropyl, sulfobutyl, hexyl, etc.); $R_5$, $R_6$, $R_7$, $R_8$, and $R_9$ each represents a member selected from the class consisting of the hydrogen atom and an alkyl group (e.g., methyl, ethyl, butyl, carboxyethyl, hydroxypropyl, sulfobutyl, etc.); and X represents an acid anion (e.g., chloride, bromide, iodide, perchlorate, sulfomate, thiocyanate, p-toluenesulfonate, benzenesulfonate, methylsulfate, etc.).

The dyes of Formulas I, II, and III above, wherein at least one of the members Y and $Y_1$ contains a group with a tertiary nitrogen atom and more particularly the said group

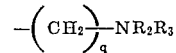

wherein $q$, $R_2$ and $R_3$ are as previously defined, are particularly efficacious in the super-sensitizing combinations of my invention and are the preferred dye species.

Many of the dye sensitizers embraced by Formulas I and II above have been previously described in the prior art. For instance, such dyes can be prepared according to the methods described in Brooker et al., U.S. Patent No. 2,161,331, issued June 6, 1939; Brooker U.S. Patent No. 2,170,807, issued Aug. 29, 1939; Brooker U.S. Patent 2,177,401, issued Oct. 24, 1939; Brooker U.S. Patent 2,185,182, issued Jan. 2, 1940; Brooker U.S. Patent 2,211,762, issued Aug. 20, 1940; Brooker et al. U.S. Patent 2,493,748, issued Jan. 10, 1950; Van Lare et al. U.S. Patent 2,548,571, issued Apr. 10, 1951; Brooker et al. U.S. Patent 2,856,404, issued Oct. 14, 1958, Jeffreys U.S. Patent 2,719,152, issued Sept. 27, 1955, etc. The preferred merocyanine type sensitizing dyes can be prepared as described in copending application Ser. No. 364,808, filed May 4, 1964, of Robert C. Taber, Leslie G. S. Brooker.

The sulfonated derivatives useful in practicing my invention comprise polynuclear aromatic compounds containing at least one sulfo group. The term "polynuclear aromatic" as used herein is intended to mean 2 or more benzene rings fused together (for example, as in naphthalene, pyrene, etc.) or at least 2 benzene rings or aromatic rings directly joined together (for example, as in diphenyl, terphenyl, quaterphenyl, etc.) or through an aliphatic linkage. Such sulfonated derivatives can conveniently be represented by the following general formula:

(IV) $\quad\quad R^1\text{—}SO_3M$ wherein $R^1$ represents a polynuclear aromatic group as defined above and M represents a hydrogen atom or a water-soluble cation salt group (e.g., sodium, potassium, ammonium, triethylammonium, triethanolammonium, pyridinium, etc.). Among the most useful of the sulfonated derivatives embraced by Formula IV above are the compounds represented by the following general formula:

(V)

wherein $B_1$ represents a 2-benzotriazolyl group or a 1,3,5-triazin-6-ylamino group, $B_2$ represents an aromatic group (i.e., benzene or substituted benzene) and M has the values given above.

Typical of the sulfonated derivatives of Formula V, above, wherein $B_1$ represents a 1,3,5-triazin-6-ylamino group (i.e., a 1,3,5-triazin-2-ylamino group) are the compounds selected from those represented by the following general formula:

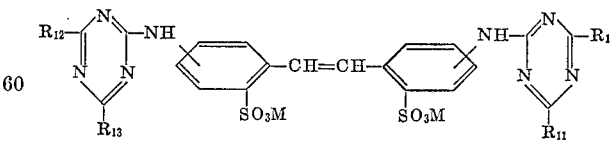

wherein M has the values given above and $R_{10}$, $R_{11}$, $R_{12}$, $R_{13}$, each represents a hydrogen atom or a substituent group, such as hydroxyl, aryloxyl (e.g., phenoxyl, o-toloxyl, p-sulphophenoxyl, etc.), alkoxyl (e.g., methoxyl, ethoxyl, etc.), a halogen atom (e.g., chlorine, bromine, etc.), a heterocyclic radical (e.g., morpholinyl, piperidyl, etc.), an alkylthio group (e.g., methylthio, ethylthio, etc.), an arylthio group (e.g., phenylthio, tolylthio, etc.), a heterocyclylthio group (e.g., benzothiazylthio, etc.), an amino group, an alkylamino group (e.g., methylamino, ethylamino, propylamino, dimethylamino, diethylamino, dodecylamino, cyclohexylamino, β-hydroxyethylamino, di-β-hydroxyethylamino, β-sulfoethylamino, etc.), an aryl-amino group (e.g., anilino, o-, m-, and p-sulfoanilino, o-, m-, and p-chloroanilino, o-, m-, and p-anisylamino, o-, m-, and p-toluidino, o-, m-, and p-carboxyanilino, hydroxyanilino, sulfonaphthylamino, o-, m-, and p-aminoanilino, o-acetamidoanilino, etc.), etc.

Compounds of Formula Va wherein $R_{10}$, $R_{11}$, $R_{12}$, and/or $R_{13}$ each represents a heterocyclylamino group (e.g., 2-benzothiazolylamino, 2-pyridylamino, etc.) can also be used practicing my invention.

Another group of sulfonated derivatives which are useful in practicing my invention are dibenzothiophene dioxides such as those represented by the following general formula:

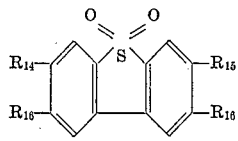

wherein $R_{14}$ is an acylamido group (e.g., acetamido, sulfobenzamido, 4 - methoxy-3-sulfobenzamido, 2-ethoxybenzamido, 2,4-diethoxybenzamido, p-tolylamido, 4-methyl-2-methoxybenzamido, 1 - naphtholylamino, 2 - naphthoylamino, 2,4-dimethoxybenzamido, 2-phenylbenzamido, 2-thienylbenzamido) or a sulfo group, $R_{15}$ represents an acylamido group (e.g., as defined by $R_{14}$ above) or a sulfoaryl group (e.g., sulfophenyl, p-sulfodiphenyl, etc.) and $R_{16}$ represents a hydrogen atom or a sulfo group, said compound containing at least one sulfo group.

Still other useful sulfonated derivatives of Formula IV above include compounds containing diphenyl, terphenyl, quaterphenyl, phenanthrene, pyrene, chrysene, etc., nuclei. Many of the above defined sulfonated compounds are shown in Jones U.S. Patent 2,961,318, issued Nov. 22, 1960.

Included among the simple merocyanine, merocarbocyanine and merodicarbocyanine dyes of Formulas I, II, and III are the following typical examples.

| Dye No. | Dye Name |
|---|---|
| I | 3-(2-diethylaminoethyl)-5-[(3-ethyl-2-benzothiazolinylidene) ethylidene]-2-thio-2,4-oxazolidinedione. |
| II | 3-(2-dimethylaminoethyl)-5-[(3-ethyl-2-benzoxazolinylidene) ethylidene]-2-thio-2,4-oxazolidinedione. |
| III | 3-(3-dimethylaminoproply)-5-[(3-ethyl-2-benzoxazolinylidene) ethylidene]-2-thio-2,4-oxazolidinedione. |
| IV | 3-(2-diethylaminoethyl)-5-[(3-ethyl-2-benzoxazolinylidene) ethylidene]-2-thio-2,4-oxazolidinedione. |
| V | 3-(2-diethylaminoethyl)-5-[(3-ethyl-2-benzothiazolinylidene) ethylidene]-2-thio-2,4-oxazolidinedione. |
| VI | 3-(3-dimethylaminopropyl)-5-[(3-ethyl-2-benzothiazolinylidene) ethylidene]-2-thio-2,4-oxazolidinedione. |
| VII | 3-(2-dimethylaminoethyl)-5-[(3-ethyl-2-benzothiazolinylidene) isopropylidene]-2-thio-2,4-oxazolidinedione. |
| VIII | 3-(3-dimethylaminopropyl)-5-[(3-ethyl-2-benzothiazolinylidene) isopropylidene]-2-thio-2,4-oxazolidinedione. |
| X | 3-(3-dimethylaminopropyl)-5-[(1,3,3-trimethyl-2-indolinylidene) ethylidene]-2-thio-2,4-oxazolidinedione. |
| X | 3-(2-dimethylaminoethyl)-5-[(1-ethyl-2(1H)-quinolylidene) ethylidene]-2-thio-2,4-oxazolidinedione. |
| XI | 3-(2-dimethylaminoethyl)-5-[(1-ethyl-4(1H)-quinolylidene) ethylidene]-2-thio-2,4-oxazolidinedione. |
| XII | 3-(3-dimethylaminopropyl)-5-[(3-methyl-2-thiazolidinylidene) ethylidene]-2-thio-2,4-oxazolidinedione. |
| XIII | 3-(3-dimethylaminopropyl)-5-[(3-ethylnaphth[2,1-d] oxazolin-2-ylidene) ethylidene]-2-thio-2,4-oxazolidinedione. |
| XIV | 3-(3-dimethylaminopropyl)-5-[(3-ethylnaphth[2,1-d] oxazolin-2-ylidene) ethylidene]-2-thio-2,4-oxazolidinedione. |
| XV | 3-(2,dimethylaminoethyl)-5-[(1-ethylnaphtho[1,2-d] thiazolin-2-ylidene) ethylidene]-2-thio-2,4-oxazolidinedione. |
| XVI | 3-(3-dimethylaminopropyl)-5-[(1-ethylnaphtho[1,2-d] thiazolin-2-ylidene) ethylidene]-2-thio-2,4-oxazolidinedione. |
| XVII | 3-(2-diethylaminoethyl)-5-[(3-methyl-2-thiazolidinylidene) ethylidene]-2-thio-2,4-oxazolidinedione. |
| XVIII | 3-(2-dimethylaminoethyl)-5-[(3-methyl-2-thiazolidinylidene) ethylidene]-2-thio-2,4-oxazolidinedione. |
| XIX | 3-(2-benzothiazolyl)-5[(3-ethyl-2-benzothiazolinylidene) ethylidene] rhodanine. |
| XX | 1-ethyl-3-[(3-ethyl-2-benzothiazolinylidene) isopropylidene]-2-thiooxindole. |
| XXI | 5-[(3-ethyl-2-benzoxazolinylidene)ethylidene]-3-ethyl-rhodanine. |
| XXII | 3-ethyl-5-[1-ethylnaphtho[1,2-d]thiazolin-2-ylidene) ethylidene]rhodanine. |
| XXIII | 3-ethyl-5-[(3-ethyl-2-benzoxazolinylidene)ethylidene]-2-thio-2,4-oxazolidienedione. |
| XXIV | 3-ethyl-5-[1,3,3-trimethyl-2-indolinylidene)ethylidene]-2-thio-2,4-oxazolidinedione. |
| XXV | 3-(3-diethylaminopropyl)-5-[(3-ethyl-2-benzoxazolinylidene) ethylidene]rhodanine. |
| XXVI | 3-ethyl-5-[(3-ethyl-2-benzothiazolinylidene)ethylidene]-2-thio-2,4-oxazolidinedione. |
| XXVII | 3-carboxymethyl-5-[(3-ethyl-2-thiazolinylidene)isopropylidene]-rhodanine. |
| XXVIII | 1-(2-diethylaminoethyl)-5-[(3-methyl-2-thiazolidinylidene)-ethylidene]-3-phenyl-2-thiohydantoin. |
| XXIX | 5-[(3-ethyl-2-benzoxazolinylidene)ethylidene]-3-methyl-1-[3-(1-pyrrolidinyl)propyl]-2-thiohydantoin. |
| XXX | 2-diphenylamino-5-[3-ethyl-benzothiazolinylidene) ethylidene]-2-thiazolin-4-one. |
| XXXI | 5-[4-(3-ethyl-2(3)-α-naphthothiazolinylidene)-2-butenylidene]-3-heptyl-1-phenyl-2-thiohydantoin. |
| XXXII | 3-ethyl-5-[(3-ethylnaphtho[2,3-d]thiazolin-2-ylidene)-2-butenylidene]rhodanine. |
| XXXIII | 3-heptyl-1-phenyl-5-[(3-(3-sulfobutyl)naphtho[2,3-d] thiazolin-2-ylidene]-2-butenylidine)-2-thiohydantoin, sodium salt. |
| XXXIV | 3-(2-dimethylaminoethyl)-5-[4-(3-ethyl-2-benzothiazolinylidene)-2-butenylidene]rhodanine. |
| XXXV | 3-ethyl-5-[4-(3-ethyl-2-benzothiazolinylidene)-2-butenylidene]-rhodanine. |
| XXXVI | 5-[4-(3-ethyl-2-benzothiazolinylidene)-2-butenylidene]-3-β-sulfoethyl-2-thio-2,4-oxazolidinedione, sodium salt. |
| XXXVII | 5-[4-(3-ethyl-2-benzoselenazolinylidene)-2-butenylidene]-1,3-diphenyl-2-thiohydantoin. |
| XXXVIII | 4-[4-(3-ethyl-2-benzothiazolinylidene)-2-butenylidene]-3-methyl-1-phenyl-2-pyrazolin-5-one. |
| XXXIX | 3-ethyl-5-[4-(3-methyl-2-thiazolinylidene)-2-butenylidene]-rhodanine. |
| XL | 3-ethyl-5-[4-(3-methyl-2-benzoselenazolinylidene)-1,3-neopentylene-2-butenylidene] rhodanine. |
| XLI | 3-methyl-4-[4-(3-methyl-2-benzoxazolinylidene)-1,3-neopentylene-2-butenylidene]-1-phenyl-2-pyrazolin-5-one. |
| XLII | 3-methyl-4-[4-(3-methyl-2-benzothiazolinylidene)-1,3-neopentylene-2-butenylidene]-1-phenyl-2-pyrazolin-5-one. |
| XLIII | 5-[(3-ethyl-2-benzothiazolinylidene) ethylidene]-3-(2-morpholinoethyl)-2-thio-2,4-oxazolidinedione. |
| XLIV | 5-[(1-ethylnaphtho[1,2-d] thiazolin-2-ylidene) ethylidene]-3-(2-morpholinoethyl)-2-thio-2,4-oxazolidinedione. |
| XLV | 5-[(3-ethyl-2-benzothiazolinylidene)ethylidene]-3-(2-morpholinoethyl)rhodanine. |
| XLVI | 3-[3-(4-methyl-1-piperazinyl)propyl]-5-[(3-methyl-2-thiazolidinylidene) rhodanine. |
| XLVII | 5-[(3-ethylnaphth[2,1-d] oxazolin-2-ylidene(ethylidene]-3-[3-(4-methyl-1-piperazinyl) propyl] rhodanine. |
| XLVIII | 5-[(3-ethyl-2-benzothiazolinylidene) ethylidene]-2-ethylimino-3-phenyl-4-thiazolidinone. |
| XLIX | 1-(2-diethylaminoethyl)-5-[(1-ethylnaphtho[1,2-d] thiazolin-2-ylidene) isopropylidene]-3-phenylbarbituric acid. |
| L | 1-(2-diethylaminoethyl)-5-[(1-ethylnaphtho[1,2-d] thiazolin-2-ylidene) isopropylidene]-3-phenyl-2-thiobarbituric acid. |
| LI | 1,3-diethyl-5-[(1-ethylnaphtho[1,2-d]thiazolin-2-ylidene)-α-ethylethylidene]-2-thiobarbituric acid. |
| LII | 3-carboxymethyl-5-(1-ethyl-2-quinolylidene) rhodanine. |
| LIII | 5-[(3-ethyl-2-benzoxazolinylidene) ethylidene]-4-oxo-1,2,3-triphenyl-2-imidazolinium iodide. |
| LIV | 5-[(-ethyl-2-benzothiazolinylidene)ethylidene]-4-oxo-1,2,3-triphenyl-2-imidazolinium iodide. |
| LV | 5-[(3-ethyl-2-benzothiazolinylidene) ethylidene]-2-methyl-4-oxo-1,3-diphenyl-2-imidazolinium iodide. |
| LVI | 3-(2-dimethylaminoethyl)-5-(3-ethyl-2-benzothiazolinylidene) rhodanine. |
| LVII | 3-ethyl-5-(1-ethyl-2-quinolylidene)-2-thio-2,4-oxazolidinedione. |
| LVIII | 1-(2-diethylaminoethyl)-3-ethyl-5-[(3-ethyl-2-benzothiazolinylidene) ethylidene] barbituric acid. |
| LIX | 5-[3-(1,2-dihydropyrrolo[2,1-b]benzothiazolyl)-methylene]-3-ethylrhodanine. |
| LX | 5-(1,2-dihydropyrrolo[1,2-a]quinol-3-ylmethylene)-3-ethylrhodanine. |
| LXI | 5-(1,2-dihydropyrrolo[1,2-a]quinol-3-ylmethylene)-3-ethyl-1-phenyl-2-thiohydantoin. |
| LXII | 5-(1,2-dihydropyrrolo[1,2-a]quinol-3-ylmethylene)-3-ethyl-2-thio-2,4-oxazolidinedione. |
| LXIII | 5-(1,2-dihydropyrrolo[1,2-a]quinol-3-ylmethylene)-1-ethyl-2-thiobarbituric acid. |
| LXIV | 5-[3-(1,2-dihydropyrrolo[2,1-b]benzothiazolyl) methylene]-3-ethyl-2-thio-2,4-oxazolidinedione. |

Included among the sulfonated derivatives of Formula IV above are the following typical examples.

| Compound | Name |
|---|---|
| A | Calcofluor White-MR. This is the trade name for a bis (s-triazin-2-ylamino)stilbene-2,2'-disulfonic acid, sodium salt. |
| B | Leucophor B. This is the trade name for a bis(s-triazin-2-ylamino)stilbene-2,2'-disulfonic acid, sodium salt. |
| C | Sodium 6-(4-methoxy-3-sulfo-w-phenylacryloyl)-pyrene. |
| D | 3,4-bis(4-methoxy-3-sulfobenzamido)-dibenzothiophene dioxide, sodium salt. |
| E | 4',4''-bis(2,4-dimethoxy-5-sulfobenzamido)-p-terphenyl, disodium salt. |
| F | Chrysene-6-sulfonic acid, sodium salt. |
| G | 4,4'-bis[2-phenoxy-4-(2-hydroxyethylamino)-1,3,5-triazin-6-ylamino]stilbene-2,2'-disulfonic acid, disodium salt. |

According to my invention, I incorporate one or more of the merocyanine dyes represented by Formulas I, II, and III above with one or more of the sulfonated derivatives represented by Formula IV above. My invention is particularly directed to the ordinarily employed gelatino-silver halide emulsions, e.g. gelatino-silver chloride, -chlorobromide, or -bromide, etc. developing-out emulsions. However, the supersensitizing combinations can be employed in silver halide emulsions in which the carrier is other than gelatin, e.g., albumin, agar-agar, etc., or a hydrophilic resinous material such as polyvinyl alcohol, partially hydrolyzed polyvinyl acetate, poly N-vinylpyrrolidone, etc. which has no deleterious effect on the light-sensitive silver halide. My emulsions advantageously contain color-forming couplers.

The optimum concentration of an individual sensitizing dye can be determined in a manner well known to those skilled in this art by measuring the sensitivity of a series of test portions of the same emulsion, each portion containing a different concenrtation of the sensitizing dye. The optimum concentration of one supersensitizing combination can, of course, be readily determined in the same manner, by measuring the sensitivity of a series of test portion of the same emulsion, each portion containing different concentrations of the components in the combination. In determining the optimum concentration for the supersensitizing combination, it is advantageous to employ, at first, a concentration of the merocyanine dye less than its optimum concentration. The concentrations of the dye can then be increased until the optimum concentration of the supersensitizing combination is determined.

The methods of incorporating sensitizing dyes in silver halide emulsions are well known to those skilled in the art and these known techniques are employed in dispersing the simple merocyanine, merocarbocyanine and merodicarbocyanine dyes, and the sulfonated derivates, of my invention in the emulsions. The dye and sulfonated derivative can be directly dispersed in the emulsions, or they can first be dissolved in some convenient solvent, such as pyridine, methyl alcohol, acetone, water, etc. (or mixtures of such solvents), or diluted with water in some instances, and added to the emulsions in the form of these solutions. If desired, they acn be separately dissolved in a given solvent and added separately to the emulsion, or they can be dissolved in the same or different solvent and these solutions mixed together before addition is made to the silver halide emulsions. The simple merocyanine, merocarbocyanine and merodicarbocyanine dyes, and the sulfonated derivatives, can be dispersed in the finished emulsions and should be uniformly distributed throughout the emulsions before the emulsions are coated on a suitable support, such as paper, glass, cellulose ester film polyvinyl resin film (e.g., polystyrene film, polyvinyl chloride film, etc.), polyester film, etc. The following procedure has been found quite satisfactory. Stock solutions of the simple merocyanine, merocarbocyanine and merodicarbocyanine dyes, and the sulfonated derivatives, are prepared by separately dissolving these in appropriate solvents as described above. Then, to the flowable silver halide emulsion, the desired amount of stock solution of one of the dyes is slowly added while stirring the emulsion. Stirring is continued until the dye is thoroughly incorporated in the emulsion. Then, the desired amount of stock solution of the sulfonated derivative is slowly added to the emulsion while stirring. Stirring is continued until thoroughly incorporated in the emulsion. The supersensitized emulsions can then be coated on a suitable support and the coating allowed to dry. In some instances, it may be desirable to heat the supersensitized emulsion for a few minutes before coating onto the suitable support. The details of such coating techniques are well known to those skilled in the art. The foregoing procedure is to be regarded only as illustrative. Clearly, my invention is directed to any silver halide emulsion containing a combination of the aforesaid simple merocyanine, merocarbocyanine, or merodicarbocyanine dyes, and sulfonated derivates of Formula IV above, whereby a supersensitizing effect is obtained.

Typical color-forming couplers used to advantage in my emulsions include the following:

PHENOLIC AND NAPHTHOLIC CYAN-DYE-FORMING COUPLERS 5-(p-amylphenoxybenzenesulfonamino)-1-naphthol
5-(N-benzyl-N-naphthalenesulfonamino)-1-naphthol
5-(n-benzyl-N-n-valerylamino)-1-naphthol
5-capropylamino-1-naphthol
2-chloro-5-(N-n-valeryl-N-p-isopropylbenzylamino)-1-naphthol
2-,4-dichloro-5-(p-nitrobenzoyl-β-o-hydroxyethylamino)-1-naphthol
2,4-dichloro-5-palmitylamino-1-naphthol
2,2′-dihydroxy-5,5′-dibromostilbene
5-diphenylethersulfonamido-1-naphthol
1-hydroxy-2-(N-isoamyl-N-phenyl)naphthamide
1-hydroxy-2-(N-p-sec.-amylphenyl)naphthamide
8-hydroxy-1-α-naphthoyl-1,2,3,4-tetrahydroquinoline
2-lauryl-4-chlorophenol
1-naphthol-2-carboxylic-α-naphthalide
1-naphthol-5-sulfo-cyclohexylamide
5-phenoxyacetamino-1-naphthol
5-β-phenylpropionylamino-1-naphthol
Monochlor-t-(N-γ-phenylpropyl-N-p-sec.-amylbenzoylamino)-1-naphthol
2-acetylamino-5-methylphenol
2-benzoylamino-3,5-dimethylphenol
2-α-(p-tert.-amylphenoxy)-n-butyrylamino-5-methylphenol
6-{γ-{4-[γ-(2,4-di-tert.-amylphenoxy)butyramido]phenoxy}acetamido}-2,4-dichloro-3-methylphenol
1-hydroxy-2-[δ-(2,4-di-tert.-amylphenoxy-n-butyl]naphthamide
2-α-(p-tert.-amylphenoxy)-n-butyrylamino-4-chloro-5-methylphenol
2-(p′-tert.-amylphenoxy-p-benzoyl)amino-4-chloro-5-methylphenol
2-(4″-tert.-amyl-3′-phenoxybenzoylamino)-3,5-dimethyl-1-phenol
2-phenylacetylamino-4-chloro-5-methylphenol
2-benzoylamino-4-chloro-5-methylphenol
2-anilinoacetylamino-4-chloro-5-methylphenol
2-{4′-[α-(4″-tert.-amylphenoxy)-n-butyrylamino]benzoylamino}-4-chloro-5-methylphenol
2[4′,3″-(4‴-tert.-amylphenoxy)benzoylamino]benzoylamino-4-chloro-5-methylphenol
2-p-nitrobenzoylamino-4-chloro-5-methylphenol
2-m-aminobenzoyl-4-chloro-5-methylphenol
2-acetamino-4-chloro-5-methylphenol
2(4′-sec.-amylbenzamino)-4-chloro-5-methylphenol
2(4′-n-amyloxybenzamino)-4-chloro-5-methylphenol
2(4′-phenoxybenzoylamino)phenol
2(4″-tert.-amyl-3′-phenoxybenzoylamino)phenol
2-[α-(4′-tert.-butylphenoxy)propionylamino]phenol
2-[α-(4′-tert.-amyl)phenoxypropionylamino]phenol
2-[N-methyl-N-(4″-tert.-amyl-3′-phenoxybenzoylamino)]phenol
2-(4″-tert.-amyl-3′-phenoxybenzoylamino)-3-methyl-1-phenol
2-(4″-tert.-amyl-3′-phenoxybenzoylamino)-6-methyl-1-phenol
2-(4″-tert.-amyl-3′-phenoxybenzoylamino)-3,6-dimethylphenol
2,6-di(4″-tert.-amyl-3′-phenoxybenzoylamino)-1-phenol
2-α-(4′-tert.-amylphenoxy)butyrylamino-1-phenol
2-(o-acetamido-β-phenylethyl)-1-hydroxynaphthamide
2(4″-tert.-amyl-3′-phenoxybenzoylamino)-3,5-dimethyl-1-phenol
2-[α-(4′-tert.-amylphenoxy)-n-butyrylamino]-5-methyl-1-phenol 2(4'''-tert.-amyl-3'-phenoxybenzoylamino)-4-chloro-1-phenol
3-[α-(4'-tert.-amylphenoxy)-n-butyrylamino]-6-chlorophenol
3-(4''-tert.-amyl-3'-phenoxybenzoylamino)phenol
2-[α-(4'-tert.-amylphenoxy)-n-butyrylamino]-6-chlorophenol
3-[α-(4'-tert.-amylphenoxy)-n-butyrylamino]-4-chlorophenol
3-[α-(4'-tert.-amylphenoxy)-n-butyrylamino]-5-chlorophenol
3-[α-(4'-tert.-amylphenoxy)-n-butyrylamino]-2-chlorophenol
2-α-(4'-tert.-amylphenoxybutyrylamino)-5-chlorophenol
2-(4'''-tert.-amyl-3'-phenoxybenzoylamino)-3-chlorophenol
5-benzene sulfonamino-1-naphthol
2,4-dichloro-5-benzenesulfonamino-1-naphthol
2,4-dichloro-5-(p-toluenesulfonamino)-1-naphthol
5-(1,2,3,4-tetrahydronaphthalene-6-sulfamino)-1-naphthol
2,4-dichloro-5-(4'-bromodiphenyl-4-sulfonamino)-1-naphthol
5-(quinoline-5-sulfamino)-1-naphthol

PYRAZOLONE AND COUMARONE MAGENTA-DYE-FORMING COUPLERS 1-p-sec.-amylphenyl-3-n-amyl-5-pyrazolone
2-cyanoacetyl-5-(p-sec.-amylbenzoylamino)coumarone
2-cyanoacetylcoumarone-5-(n-amyl-p-sec.-amylsulfanilide)
2-cyanoacetylcoumarone-5-(N-n-amyl-p-tert.-amylsulfanilide)
2-cyanoacetylcoumarone-5-sulfon-N-n-butylanilide
2-cyanoacetyl-5-benzoylamino-coumarone
2-cyanoacetylcoumarone-5-sulfondimethylamide
2-cyanoacetylcoumarone-5-sulfon-N-methylanilide
2-cyanoacetylnapthalene sulfon-N-methylanilide
2-cyanoacetylcoumarone-5-(N-γ-phenylpropyl)-p-tert.-amylsulfonanilide
1-p-laurylphenyl-3-methyl-5-pyrazolone
1-β-naphthyl-3-amyl-5-pyrazolone
1-p-nitrophenyl-3-n-amyl-5-pyrazolone
1-p-phenoxyphenyl-3-n-amyl-5-pyrazolone
1-phenyl-3-n-amyl-5-pyrazolone
1,4-phenylene bis-3-(1-phenyl-5-pyrazolone)
1-phenyl-3-acetylamino-5-pyrazolone
1-phenyl-3-propionylamino-5-pyrazolone
1-phenyl-3-n-valerylamino-5-pyrazolone
1-phenyl-3-chloroacetylamino-5-pyrazolone
1-phenyl-3-dichloroacetylamino-5-pyrazolone
1-phenyl-3-benzoylamino-5-pyrazolone
1-phenyl-3-(m-aminobenzoyl)amino-5-pyrazolone
1-phenyl-3-(p-sec.-amylbenzoylamino)-5-pyrazolone
1-phenyl-3-diamylbenzoylamino-5-pyrazolone
1-phenyl-3-β-naphthoylamino-5-pyrazolone
1-phenyl-3-phenylcarbamylamino-5-pyrazolone
1-phenyl-3-palmitylamino-5-pyrazolone
1-phenyl-3-benzenesulfonylamino-5-pyrazolone
1-(p-phenoxyphenol)-3-(p-tert.-amyloxybenzoyl)amino-5-pyrazolone
1-(2',4',6'-tribromophenyl)-3-benzamido-5-pyrazolone
1-(2',4',6'-trichlorophenyl)-3-benzamido-5-pyrazolone
1-(2',4',6'-trichlorophenyl)-3-phenylacetamido-5-pyrazolone
1-(2',4',6'-tribromophenyl)-3-phenylacetamido-5-pyrazolone
1-(2',4'-dichlorophenyl)-3-[3''-(2''',4'''-di-tert.-amylphenoxyacetamido)benzamido]-5-pyrazolone
1-(2',4',6-trichlorophenyl)-3-[3''-(2''',4'''-di-tert.-amylphenoxyacetamido)benzamido]-5-pyrazolone
1-(2',4',6'-tribromophenyl)-3-[3''-(2''',4'''-di-tert.-amylphenoxyacetamido)benzamido]-5-pyrazolone
1-(2',4',6'-trichlorophenyl)-3-[β-(2''',4'''-di-tert.-amylphenoxy)propionamido]-5-pyrazolone
1-(2',4',6'-tribromophenyl)-3-[β-(2''',4'''-di-tert.-amylphenoxy)propionamido]-5-pyrazolone
1-(2',5'-dichloro)-3-[3''-(4'''-tert.-amylphenoxy)benzamido]-5-pyrazolone
1-(2',4',6'-tribromophenyl)-3-[3''-(4'''-tert.-amylphenoxy)benzamido]-5-pyrazolone
1-(2',5'-dichlorophenyl)-3-[3''-(2''',4'''-di-tert.-amylphenoxyacetamido)benzamido]-5-pyrazolone
1-(2',4',6'-trichlorophenyl)-3-[α-(4-nitrophenoxy)acetamido]-5-pyrazolone
1-(2',4',6'-trichlorophenyl)-3-(4-nitroanilino)-5-pyrazolone

OPEN CHAIN YELLOW-DYE-FORMING COUPLERS

N-amyl-p-benzoylacetaminobenzenesulfonate
N-(4-anisoylacetaminobenzenesulfonyl)-N-benzyl-m-toluidine
N-(4-benzoylacetaminobenzenesulfonyl)-N-benzyl-m-toluidine
N-(4-benzoylacetaminobenzenesulfonyl)-N-n-amyl-p-toluidine
N-(4-benzoylacetaminobenzenesulfonyl)-N-benzylaniline
ω-(p-Benzoylbenzoyl)acetanilide
ω-Benzoylacet-2,5-dichloroanilide
ω-Benzoyl-p-sec.-amylacetanilide
N,N'-di(ω-benzoylacetyl)-p-phenylenediamine
N,N'-di-acetoacetamino)diphenyl
α-{3-[α-(2,4-di-tert.-amylphenoxy)butyramido]benzoyl}-2-methoxyacetanilide
α-{3-[α-(2,4-di-tert.-amylphenoxy)acetamido]benzoyl}-2-methoxyacetanilide
4,4'-di-(acetoacetamino)-3,3'-dimethyldiphenyl
p,p'-di-(Acetoacetamino)diphenylmethane
Ethyl-p-benzoylacetaminobenzenesulfonate
Nonyl-p-benzoylacetaminobenzenesulfonate
N-phenyl-N'-(p-acetoacetaminophenyl)urea
n-Propyl-p-benzoylacetaminobenzenesulfonate acetoacetpiperidine
ω-Benzoylacetpiperidide
N(ω-benzoylacetyl)-1,2,3,4-tetrahydroquinoline
N(ω-benzoylacetyl)morpholine The following examples will serve to illustrate further the manner of practicing my invention.

To different portions of the same batch of photographic gelatino-silver-bromiodide emulsion were added (1) a simple merocyanine, merocarbocyanine or merodicarbocyanine, (2) a sulfonated derivative of Formula IV above, and (3) a combination of (1) and (2). The emulsions were held for a short time at about 50–52° C., coated on a transparent support, chill set and dried. The coatings were then exposed to a tungsten light source in an Eastman Sensitometer (Type 1B) through either a Wratten #12 Filter which transmits substantially no light of wavelength shorter than about 495 mμ (except for about 1% between 300 and 340 mμ), a Wratten #16 Filter which transmits substantially no light of wavelength shorter than about 520 mμ, or a Wratten #58 Filter which transmits only light of wavelength lying between 465 and 620 mμ. The filter was selected to correspond to the sensitizing region of the particular simple merocyanine, merocarbocyanine or merodicarbocyanine dye illustrated. The exposed coatings were then processed for three minutes in a developer having the following composition:

| | G. |
|---|---|
| N-methyl-p-aminophenol sulfate | 2.0 |
| Hydroquinone | 8.0 |
| Sodium sulfite (desiccated) | 90.0 |
| Sodium carbonate (monohydrate) | 52.5 |
| Potassium bromide | 5.0 |

Water to make 1 liter.

fixed in a conventional sodium thiosulfate fixing bath, washed and dried. The speed, gamma and fog for each of the coatings was then measured.

The invention is further illustrated by the following examples.

Example 1

A silver bromoiodide emulsion was made of the type described by Trivelli and Smith, Phot. Journal, vol. 79,330 (1939). The melted emulsion was divided into separate portions to which were added a solution of the sensitizers I to XVI and XIX to XXIV and combinations of these with sulfonated compounds A and B as indicated in Table 1. Each portion was digested at 50° C. for 10 minutes and then coated on a cellulose acetate film support and dried. The dried samples were then given identical exposure in an Eastman Sensitometer (Type 1B) through a Wratten #16 Filter of 1 second to a tungsten light source, processed for 3 minutes in the aforementioned developer, fixed, washed and dried. Densitometric measurements were made of the developed images on each coating. The relative speed values were calculated based on an arbitrary relative speed of 100 for the coating sensitized with 0.065 g. of Dye I per mole of silver halide and the gamma values determined. These values together with the fog values are given in Table 1

TABLE 1

| Dye and Concentration (g. per mol silver halide) | Relative Speed | Gamma | Fog |
|---|---|---|---|
| I (.065) | 100 | 4.80 | .06 |
| I (.065) plus A (0.86) | 224 | 3.60 | .04 |
| I (.065) plus B (1.7) | 447 | 3.76 | .04 |
| II (.065) | 4.6 | 1.60 | .12 |
| II (.065) plus B (1.7) | 26.5 | 3.60 | .10 |
| III (.07) | 59 | 3.96 | .08 |
| III (.07) plus B (1.7) | 355 | 3.44 | .04 |
| IV (.07) | 49 | 3.92 | .10 |
| IV (.07) plus B (1.7) | 170 | 3.68 | .07 |
| V (.06) | 34 | 4.00 | .08 |
| V (.06) plus B (1.7) | 155 | 3.86 | .06 |
| VI (.065) | 174 | 3.94 | .06 |
| VI (.065) plus B (1.7) | 977 | 3.80 | .04 |
| VII (.065) | 62 | 4.90 | .10 |
| VII (.065) plus B (1.7) | 309 | 4.20 | .06 |
| VIII (.067) | 562 | 4.20 | .12 |
| VIII (.067) plus B (1.7) | 1,780 | 2.82 | .04 |
| IX (.068) | 39 | 3.84 | .08 |
| IX (.068) plus B (1.7) | 234 | 4.00 | .08 |
| X (.065) | 48 | 5.25 | .12 |
| X (.065) plus B (1.7) | 309 | 5.00 | .06 |
| XI (.065) | 62 | 4.70 | .30 |
| XI (.065) plus B (1.7) | 195 | 4.50 | .10 |
| XII (.068) | 9.7 | 4.40 | .06 |
| XII (.068) plus B (1.7) | 41 | 3.44 | .05 |
| XIII (.065) | 5.7 | 2.30 | .12 |
| XIII (.065) plus B (1.7) | 159 | 4.80 | .08 |
| XIV (.068) | 246 | 5.00 | .06 |
| XIV (.068) plus B (1.7) | 813 | 3.62 | .06 |
| XV (.065) | 39 | 5.00 | .08 |
| XV (.065) plus B (1.7) | 389 | 3.80 | .06 |
| XVI (.068) | 389 | 4.50 | .07 |
| XVI (.068) plus B (1.7) | 1,820 | 3.40 | .05 |
| XIX (.13) | 83 | 3.84 | .06 |
| XIX (.13) plus B (1.7) | 107 | 3.52 | .06 |
| XX (.13) | 5 | 1.06 | .04 |
| XX (.13) plus B (1.7) | 11.8 | 1.94 | .04 |
| XXI (.13) | 1,230 | 2.10 | .04 |
| XXI (.13) plus B (1.7) | 1,450 | 2.08 | .03 |
| XXII (.13) | 2,140 | 3.50 | .04 |
| XXII (.13) plus B (1.7) | 2,690 | 3.26 | .05 |
| XXIII (.13) | 324 | 3.46 | .04 |
| XXIII (.13) plus B (1.7) | 407 | 2.64 | .03 |
| XXIV (.13) | 417 | 3.72 | .05 |
| XXIV (.13) plus B (1.7) | 708 | 3.28 | .04 |

It will be noted that in each instance markedly improved sensitivity was obtained by addition of sulfonated compounds A or B to the dye sensitizer.

Example 2

Coating were made as in Example 1 excepting that dye sensitizers XVII and combinations thereof with sulfonated compounds A and B were used. These coatings were exposed through a Wratten #12 Filter, processed and the density measurements made. The relative speed, gamma and fog values were determined and are listed in Table 2.

TABLE 2

| Dye and Concentration (g. per mol silver halide) | Relative Speed | Gamma | Fog |
|---|---|---|---|
| XVII (.065) | 100 | 1.90 | .08 |
| XVII (.065) plus A (.86) | 282 | 3.52 | .05 |
| XVII (.065) plus B (1.7) | 490 | 3.72 | .05 |

The relative speed was improved by addition of sulfonated compounds A and B by factors of about 3 and 5, respectively.

Example 3

Coatings were made as in Example 1, excepting that dye sensitizer XVIII and combination thereof with sulfonated compound B were used. These coatings were exposed through a Wratten #58 Filter, processed and the density values measured. The relative speeds, gammas and fog values are listed below.

TABLE 3

| Dye and Concentration (g. per mol silver halide) | Relative Speed | Gamma | Fog |
|---|---|---|---|
| XVIII (.065) | 100 | 1.80 | .07 |
| XVIII (.065) plus B (1.7) | 309 | 4.00 | .08 |

The relative speed showed an increase of about 3 times by the addition of sulfonated compound B.

Example 4

Coatings were made as in Example 1 except that dye sensitizers I, XXV, XXVI and XXVII and combinations of I with sulfonated compounds D, E, F and G, combination of XXV with sulfonated compound B, and combinations of XXVI and XXVII with sulfonated compound C, were used. These coatings were exposed through a Wratten #16 Filter, processed and the relative speeds (based on 100 for Dye XXV), gammas and fog values determined. The results are recorded in Table 4.

TABLE 4

| Dye and Concentration (g. per mol silver halide) | Relative Speed | Gamma | Fog |
|---|---|---|---|
| XXV (.13) | 100 | 3.84 | .04 |
| XXV (.13) plus B (1.7) | 159 | 2.70 | .04 |
| XXVI (.13) | 65 | 3.06 | .04 |
| XXVI (.13) plus C (1.0) | 135 | 2.62 | .04 |
| I (.065) | 8 | 4.50 | .07 |
| I (.065) plus D (2.1) | 30 | 4.10 | .04 |
| I (.065) plus E (1.0) | 21.5 | 4.10 | .06 |
| I (.065) plus F (2.1) | 16.5 | 4.50 | .05 |
| I (.065) plus G (1.5) | 59 | 3.90 | .04 |
| XXVII (.13) | 110 | 2.90 | .04 |
| XXVII (.13) plus B (1.7) | 135 | 2.20 | .04 |

In each instance, the sensitivity was markedly increased by the addition of the specified sulfonated compounds to the specified dyes.

Example 5

Coatings were made as in Example 1, excepting that dye sensitizer XXVIII and combination thereof with sulfonated compound B were used These coatings were exposed through a Wratten #16 Filter, processed and the density values measured. The relative speed, gamma and fog values obtained are shown in Table 5.

TABLE 5

| Dye and Concentration (g. per mol silver halide) | Relative Speed | Gamma | Fog |
|---|---|---|---|
| XXVIII (.065) | 100 | 2.94 | .04 |
| XXVIII (.065) plus B (1.7) | 118 | 2.72 | .04 |

The relative speed was increased 18% by the addition of sulfonated compound B to Dye XXVIII.

Example 6

Coatings were made as in Example 1, excepting that dye sensitizers XXIX and XXX and combinations of these with sulfonated compound B were used. These coatings were exposed through a Wratten #16 Filter, processed within 15 seconds after exposure, and the density values measured. The relative speed (based on 100 for Dye XXIX), gamma and fog values are listed in Table 6.

TABLE 6

| Dye and Concentration (g. per mol silver halide) | Relative Speed | Gamma | Fog |
|---|---|---|---|
| XXIX (0.13) | 100 | 4.00 | .04 |
| XXIX (0.13) plus B (1.7) | 118 | 2.90 | .05 |
| XXX (0.13) | 219 | 2.90 | .06 |
| XXX (0.13) plus B (1.7) | 257 | 3.30 | .10 |

Substantial increases in relative speeds are shown in the above table by the addition of sulfonated compound B to Dyes XXIX and XXX.

Example 7

Coatings were made as in Example 1, excepting that dye sensitizers XXI, XXXII, and XXXIII and combinations of these with sulfonated compound A were used. These coatings were exposed through a Wratten #16 Filter, processed and the relative speeds (based on 100 for Dye XXI), gammas and fog values determined. These values are recorded in following Table 7.

TABLE 7

| Dye and Concentration (g. per mol silver halide) | Relative Speed | Gamma | Fog |
|---|---|---|---|
| XXXI (0.104) | 100.0 | 4.00 | .04 |
| XXXI (0.104) plus A (0.94) | 229.0 | 3.50 | .04 |
| XXXII (0.104) | 17.5 | 3.80 | .06 |
| XXXII (0.104) plus A (0.94) | 37.0 | 2.40 | .06 |
| XXXIII (0.104) | 6.5 | 3.70 | .06 |
| XXXIII (0.104) plus A (0.94) | 26.5 | 3.80 | .06 |

In each instance, the relative speed was markedly increased, for example, over two fold in the case of Dyes XXI and XXXII, and approximately four fold in the case of Dye XXXIII, by combination with sulfonated compound A.

Example 8

Coatings were made as in Example 1, excepting that a silver chlorobromide emulsion and dye sensitivers XXXIV to LVIII and combinations of each of these with sulfonated compound B were used. These coatings were exposed, through a Wratten #16 Filter, except LVI to LVIII which were exposed through a Wratten #4 Filter, processed and the relative speeds (based on 100 for each of Dyes XXXIV, XLVIII, LVI and LVII as indicated), gammas and fog values determined. A Wratten #4 Filter transmits substantially no light of wavelength shorter than about 450 mµ.

The values obtained are listed in Table 8.

TABLE 8

| Dye and Concentration (g. per mol silver halide) | Relative Speed | Gamma | Fog |
|---|---|---|---|
| XXXIV (.026) | 100 | 4.60 | .04 |
| XXXIV (.026) plus B(1.7) | 195 | 4.20 | .04 |
| XXXV (.026) | 110 | 4.90 | .04 |
| XXXV (.026) plus B(1.7) | 166 | 3.86 | .04 |
| XXXVI (.026) | 83 | 5.20 | .04 |
| XXXVI (.026) plus B(1.7) | 166 | 4.90 | .04 |
| XXXVII (.026) | 214 | 4.50 | .04 |
| XXXVII (.026) plus B(1.7) | 257 | 5.00 | .04 |
| XXXVIII (.026) | 132 | 4.00 | .06 |
| XXXVIII (.026) plus B(1.7) | 372 | 3.56 | .03 |
| XXXIX (.026) | 257 | 4.60 | .04 |
| XXXIX (.026) plus B(1.7) | 316 | 3.96 | .04 |
| XL (.026) | 115 | 4.50 | .04 |
| XL (.026) plus B(1.7) | 141 | 4.60 | .04 |
| XLI (.032) | 309 | 4.40 | .04 |
| XLI (.032) plus B(1.7) | 355 | 4.20 | .04 |
| XLII (.032) | 289 | 3.80 | .04 |
| XLII (.032) plus B(1.7) | 562 | 3.40 | .04 |
| XLIII (.10) | 16.5 | 4.30 | .07 |
| XLIII (.10) plus B(1.7) | 35.3 | 4.30 | .06 |
| XLIV (.10) | 60 | 4.00 | .06 |
| XLIV (.10) plus B(1.7) | 85 | 3.08 | .04 |
| XLV (.10) | 316 | 4.00 | .04 |
| XLV (.10) plus B(1.7) | 407 | 3.30 | .04 |
| XLVI (.10) | 145 | 4.20 | .04 |
| XLVI (.10) plus B(1.7) | 289 | 3.20 | .03 |
| XLVII (.10) | 525 | 4.00 | .05 |
| XLVII (.10) plus B(1.7) | 661 | 3.02 | .04 |
| XLVIII (.13) | 100 | 5.60 | .04 |
| XLVIII (.13) plus B(1.7) | 129 | 4.50 | .04 |
| XLIX (.13) | 15.9 | 3.68 | .03 |
| XLIX (.13) plus B(1.7) | 27 | 3.42 | .03 |
| L (.13) | 53 | 2.96 | .04 |
| L (.13) plus B(1.7) | 118 | 2.96 | .04 |
| LI (.13) | 27 | 2.98 | .03 |
| LI (.13) plus B(1.7) | 33 | 2.58 | .03 |
| LII (.13) | 15.9 | 2.80 | .03 |
| LII (.13) plus B(1.7) | 26 | 2.50 | .03 |
| LIII (.10) | 23 | 3.06 | .03 |
| LIII (.10) plus B(1.7) | 46 | 2.80 | .03 |
| LIV (.10) | 118 | 3.84 | .03 |
| LIV (.10) plus B(1.7) | 339 | 3.10 | .03 |
| LV (.10) | 29 | 4.00 | .03 |
| LV (.10) plus B(1.7) | 102 | 3.40 | .03 |
| LVI (.13) | 100 | 3.70 | .04 |
| LVI (.13) plus B(1.7) | 123 | 3.10 | .04 |
| LVII (.13) | 100 | 2.50 | .04 |
| LVII (.13) plus B(1.7) | 141 | 2.80 | .03 |
| LVIII (.13) | 170 | 4.10 | .03 |
| LVIII (.13) plus B(1.7) | 309 | 3.80 | .04 |

Reference to above Table 8 shows that the relative speeds were substantially increased for each of the specified dye sensitizers when used in combination with sulfonated compound B.

Example 9

Coatings were made as in Example 1, excepting that dye sensitizers LIX to LXIII and combinations of each of these with sulfonated compound A were used. These coatings were exposed through a Wratten #16 Filter, processed and the relative speeds, gamma and fog values determined as set forth in Table 9.

TABLE 9

| Dye and Concentration (g. per mol silver halide) | Relative Speed | Gamma | Fog |
|---|---|---|---|
| LIX (.07) | 289 | 4.80 | .08 |
| LIX (.07) plus A(1.0) | 725 | 3.96 | .04 |
| LX (.07) | 251 | 3.68 | .08 |
| LX (.07) plus A(1.0) | 550 | 3.40 | .06 |
| LXI (.07) | 795 | 4.20 | .22 |
| LXI (.07) plus A(1.0) | 1,200 | 3.96 | .06 |
| LXII (.07) | 115 | 4.10 | .58 |
| LXII (.07) plus A(1.0) | 436 | 4.20 | .16 |
| LXIII (.07) | 1,200 | 3.06 | .06 |
| LXIII (.07) plus A(1.0) | 1,660 | 2.60 | .04 |
| LXIV (.07) | 1,380 | | 1.21 |
| LXIV (.07) plus A(1.0) | 1,660 | 3.50 | .14 |

Above Table 9 clearly shows that the relative speeds were substantially increased for each of the specified dye sensitizers when used in combination with sulfonated compound A.

The following example will illustrate the utility of my supersensitizing combinations in coupler incorporating multi-layer elements for color photography.

Example 10

Two multi-layer color coatings each comprising a support coated in succession with (1) a blue-sensitive silver halide emulsion containing a yellow-dye-forming coupler, (2) a green-sensitive silver halide emulsion containing a magenta-dye-forming coupler, and (3) a red-sensitive silver halide emulsion containing a cyan-dye-forming coupler and the sensitizer 3-Heptyl-1-phenyl-5-{4-[3-(3-sulfobutyl)naphtho - [2,3 - d]thiazolin - 2 - ylidene]-2-butenylidene}-2-thiohydantoin triethylamine salt were prepared with the variations described below in the red-sensitive emulsion layer. Each coating was exposed to red light on an intensity scale sensitometer using a number 29 Wratten Filter and then processed through the Eastman Color Print Process with the following results.

| Multilayer Element | Mg. of Sensitizing Dye per Mole of Silver | Mg. of Compound A per Mole of Silver | Relative Speed | Fog Density |
|---|---|---|---|---|
| 1 | 60 | (¹) | 100 | .06 |
| 2 | 60 | 300 | 138 | .06 |

¹ None.

The accompanying drawing illustrates the supersensitizing effect obtained with three of my new combinations in gelatino-silver-bromoiodide emulsion. Each figure of the drawing is a diagrammatic reproduction of two spectrograms. In each figure, the sensitivity of the emulsion containing the merocyanine dye of Formulas I, II or III is represented by the solid lower curve. The upper curve (dotted line) represents the sensitivity conferred on the emulsion by the combination of the merocyanine dye with one of the sulfonated compounds of my invention. No curve illustrating the effect of the sulfonated compound alone is shown, inasmuch as it has been found that these sulfonated compounds have little or no measurable effect on the sensitivity of the emulsions.

In FIGURE 1, curve A represents the sensitivity of an ordinary gelatino-silver-bromoiodide emulsion sensitized with 3 - (2 - diethylaminoethyl-5-[(3-ethyl-2-benzothiazo-inylidene)ethylidene]-2-thio-2,4-oxazolidinedione) (Dye I), while curve B represents the sensitivity of the same emulsion sensitized with a combination of above Dye I and Leucophor B (a bis (s-triazin-2-ylamino) stilbene-2,2'-disulfonic acid, sodium salt). The sensitometric measurements for these emulsions are given in above Table 1.

In FIGURE 2, curve C represents the sensitivity of an ordinary gelatino-silver-bromoiodide emulsion sensitized with 3-(3-dimethylaminopropyl)-5-[(3-ethyl-2-benzothia-zolinylidene) isopropylidene]-2-thio-2,4-oxazolidinedione (Dye VIII), while curve D represents the sensitivity of the same emulsion sensitized with a combination of above Dye VIII and Leucophor B (a bis(s-triazin-2-ylamino) stilbene-2,2'-disulfonic acid, sodium salt). The sensitometric measurements for these emulsions are given in above Table 1.

In FIGURE 3, curve E represents the sensitivity of an ordinary gelatino-silver-bromoiodide emulsion sensitized with 5-[4-(3-ethyl - 2(3) - α - naphthothiazolinylidene)-butenylidene]-3-n-heptyl-1-phenyl-2-thiohydantoin (Dye XXXI), while curve F represents the sensitivity of the same emulsion sensitized with a combination of above Dye XXXI and Calcofluor White-MR (a bis(s-triazin-2-ylamino) stilbene-2,2'-disulfonic acid, sodium salt). The sensitometric measurements for these emulsions are given in above Table 7.

The term "sulfo" is used in the foregoing and in the following claims to mean both the free acid group, as well as salts of this free acid group, including alkali metal salts (e.g., sodium, potassium, etc.), ammonium salts, amine addition salts (e.g., triethylamine, ethanolamine, triethanolamine, pyridine, picoline, etc.). These water-soluble salt derivatives can also be used to advantage.

This invention has been described in detail with particular reference to preferred embodiments thereof, but it will be understood that variations and modifications can be effected within the spirit and the scope of the invention as described herein above and as defined in the appended claims.

I claim:

1. A photographic silver halide emulsion containing (1) at least one merocyanine dye represented by the general formulas:

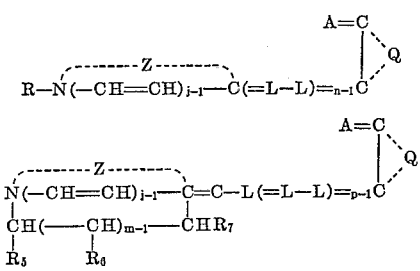

and

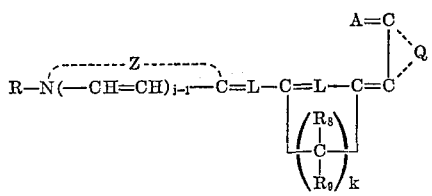

wherein each A represents a member selected from the class consisting of an oxygen atom and a sulfur atom; R represents a group selected from the class consisting of an alkyl group and an aryl group; Z represents the nonmetallic atoms required to complete a 5- to 6-membered heterocyclic nucleus; L represents a methine group; $i$, $m$ and $p$ each represents an integer of from 1 to 2; $k$ represents an integer of from 2 to 3; $n$ represents an integer of from 1 to 3; Q represents a group selected from the class consisting of

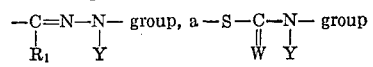

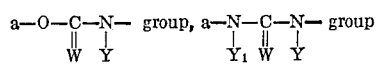

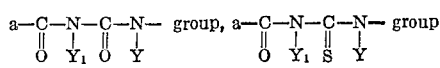

and

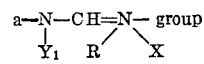

$R_1$ represents a member selected from the class consisting of the hydrogen atom, an alkyl group, an aryl group, an amino group, an acylamino group, a substituted sulfonamido group, a substituted sulfamyl group and a substituted carbamyl group; W represents an atom selected from the class consisting of oxygen, selenium and sulfur; Y and $Y_1$ each represent a group selected from the class consisting of the hydrogen atom, an alkyl group, an aryl group,

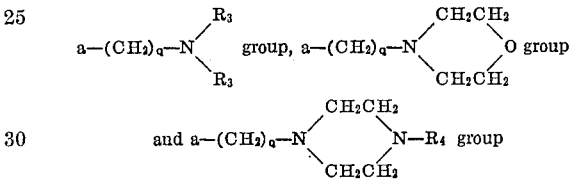

$q$ represents an integer of from 1 to 6; $R_2$, $R_3$ and $R_4$ each represents an alkyl group; $R_5$, $R_6$, $R_7$, $R_8$ and $R_9$ each represents a member selected from the class consisting of the hydrogen atom and an alkyl group; and X represents an acid anion; and (2) at least one sulfonic acid derivative of a compound selected from the class consisting of a bis(triazinylamino)stilbene, a dibenzothiophene dioxide, a biphenyl, a terphenyl, a quaterphenyl, a phenanthrene, a pyrene, and a chrysense.

2. A photographic silver halide emulsion containing (1) at least one merocyanine dye represented by the general formulas:

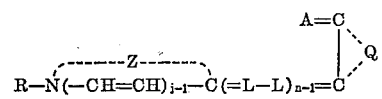

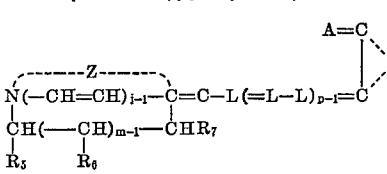

and

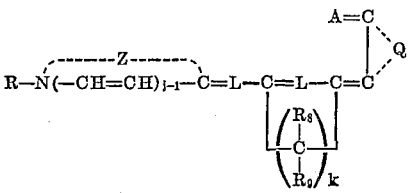

wherein each A represents a member selected from the class consisting of an oxygen atom and a sulfur atom; R represents a group selected from the class consisting of an alkyl group and an aryl group; Z represents the nonmetallic atoms required to complete a 5- to 6-membered heterocyclic nucleus selected from the class consisting of a thiazole nucleus, a benzothiazole nucleus, a naphthothiazole nucleus, a thianaphtheno-7',6',4,5-thiazole nucleus, a selenazole nucleus, a benzoselenazole nucleus, a naphthoselenazole nucleus, a thiazoline nucleus, a 2-pyridine nucleus, a 4-pyridine nucleus, a 2-quinoline nucleus, a 4-quinoline nucleus, a 1-isoquinoline nucleus, a 3-isoquinoline nucleus, a 3,3-dialkylindoleneine nucleus, an imidazole nucleus, a benzimidazole nucleus, and a naphthimidazole nucleus; L represents a methine group; $j$, $m$ and $p$ each represents an integer of from 1 to 2; $k$ represents an integer of 2 to 3; $n$ represents an integer of from 1 to 3; Q represents a group selected from the class consisting of

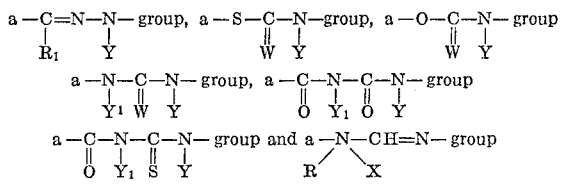

$R_1$ represents a member selected from the class consisting of the hydrogen atom, an alkyl group, an aryl group, an amino group, an acylamino group, a substituted sulfonamido group, a substituted sulfamyl group and a substituted carbamyl group; W represents an atom selected from the class consisting of oxygen, selenium and sulfur; Y and $Y_1$ each represent a group selected from the class consisting of the hydrogen atom, an alkyl group, an aryl group, a

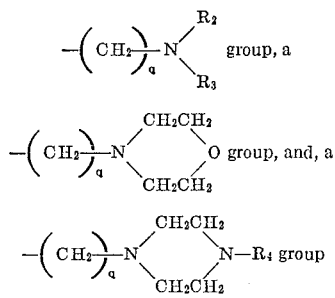

$q$ represents an integer of from 1 to 6, $R_2$, $R_3$ and $R_4$ each represents an alkyl group; $R_5$, $R_6$, $R_7$, $R_8$ and $R_9$ each represents a member selected from the class consisting of the hydrogen atom and an alkyl group; and X represents an acid anion; and (2) at least one sulfonic acid derivative of a compound selected from the class consisting of a bis(triazinylamino)stilbene, a dibenzothiophene dioxide, a biphenyl, a terphenyl, a quaterphenyl, phenanthrene, a pyrene, and a chrysene.

3. A photographic silver halide emulsion of claim 2 wherein said (2) is a sulfonic acid derivative of a bis(triazinylamino) stilbene.

4. A photographic silver halide emulsion of claim 2 wherein said (2) is a sulfonic acid derivative of a dibenzothiophene dioxide.

5. A photographic silver halide emulsion of claim 2 wherein said (2) is a sulfonic acid derivative of a terphenyl.

6. A photographic silver halide emulsion of claim 2 wherein said (2) is a sulfonic acid derivative of a pyrene.

7. A photographic silver halide emulsion of claim 2 wherein said (2) is a sulfonic acid derivative of a chrysene.

8. A photographic silver halide emulsion of claim 2 wherein said (2) is a sulfonic acid derivative of a phenanthrene.

9. A photographic silver halide emulsion of claim 2 containing a color-forming coupler.

10. A photographic silver halide emulsion of claim 2 in which the merocyanine dye is 3-(2-diethylaminoethyl) - 5 - [(3-ethyl-2-benzothiazolinylidene) ethylidene]-2-thio-2,4-oxazolidinedione and the said (2) is a bis(s-triazin-2-ylamino) stilbene-2,2'-disulfonic acid, sodium salt.

11. A photographic silver halide emulsion of claim 2 in which the merocyanine dye is 3-(3-dimethylaminopropyl) - 5 - [(3-ethyl-2-benzothiazolinylidene) isopropylidene]-2-thio-2,4-oxazolidinedione and the said (2) is a bis(s-triazin-2-ylamino)stilbene2,2'-disulfonic acid, sodium salt.

12. A photographic silver halide emulsion of claim 2 in which the merocyanine dye is 5-[4-(3-ethyl-2(3)-α-naphthothiazolinylidene)-butenylidene] - 3 - n - heptyl-1-phenyl-2-thiohydantoin and the said (2) is a bis(s-triazin-2-ylamino)stilbene-2,2'-disulfonic acid, sodium salt.

13. A photographic silver halide emulsion of claim 2 in which the merocyanine dye is 3-(2-diethylaminoethyl) - 5 - [(3-ethyl-2-benzothiazolinylidene) ethylidene]-2-thio-2,4-oxazolidinedione and the said (2) is 3,7-bis-(4-methoxy-3-sulfobenzamido)-dibenzothiophene dioxide, sodium salt.

14. A photographic silver halide emulsion of claim 2 in which the merocyanine dye is 3-ethyl-5-[(3-ethyl-2-benzothiazolinylidene]-2-thio - 2,4 - oxazolidinedione and the said (2) is sodium 6-(4-methoxy-3-sulfo-w-phenyl-acryloyl) pyrene.

15. A photographic silver halide emulsion of claim 2 in which the merocyanine dye is 3-(2-diethylaminoethyl) - 5 - [(3-ethyl-2-benzothiazolinylidene) ethylidene]-2-thio-2,4-oxazolidinedione and the said (2) is chrysene-6-sulfonic acid, sodium salt.

16. A photographic silver halide emulsion of claim 2 in which the merocyanine dye is 3-(2-diethylaminoethyl) - 5 - [(3-ethyl-2-benzothiazolinylidene) ethylidene]-2-thio-2,4-oxazolidinedione and the said (2) is 4',4''-bis (2,4-dimethoxy-5-sulfobenzamido) p-terphenyl, disodium salt.

References Cited

UNITED STATES PATENTS

| | | | |
|---|---|---|---|
| 2,875,058 | 2/1959 | Carroll et al. | 96—104 |
| 2,933,390 | 4/1960 | McFall et al. | 96—104 |
| 2,944,901 | 7/1960 | Carroll | 96—102 |
| 2,947,630 | 8/1960 | Jones | 96—104 |
| 2,950,196 | 8/1960 | Carroll et al. | 96—104 |
| 2,961,318 | 11/1960 | Jones | 96—104 |

J. TRAVIS BROWN, *Primary Examiner.*

U.S. Cl. X.R.

96—102, 104, 105

PO-1050
(5/69)

UNITED STATES PATENT OFFICE
CERTIFICATE OF CORRECTION

Patent No. 3,416,927          Dated December 17, 1968

Inventor(s) Norman W. Kalenda

It is certified that error appears in the above-identified patent and that said Letters Patent are hereby corrected as shown below:

Column 16, lines 25-27, the expression reading

" $-(CH_2)_q-N\begin{smallmatrix}R_3\\R_3\end{smallmatrix}$ " should read --- $-(CH_2)_q-N\begin{smallmatrix}R_2\\R_3\end{smallmatrix}$ ---;

and in line 74 between the expressions "nucleus," and "a selenazole", insert --an oxazole nucleus, a benzoxazole nucleu a naphthoxazole nucleus,--. Column 17, lines 15-18, the expre sion reading " $-\underset{R\ X}{N}-CH=N-$ group " should read, -- $-\underset{Y_1}{N}-CH=\underset{R\ X}{N}-$ group --.

SIGNED AND
SEALED
OCT 13 1970

(SEAL)
Attest:

Edward M. Fletcher, Jr.
Attesting Officer

WILLIAM E. SCHUYLER, JR.
Commissioner of Patents